(12) United States Patent
Kameyama et al.

(10) Patent No.: US 11,400,625 B2
(45) Date of Patent: Aug. 2, 2022

(54) INJECTION FOAM MOLDING METHOD (71) Applicant: Toyota Jidosha Kabushiki Kaisha, Toyota (JP)

(72) Inventors: Tsuyoshi Kameyama, Nagoya (JP); Kikuo Sugimura, Toyota (JP); Taro Fukuta, Miyoshi (JP); Hirokazu Kandori, Nishio (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 229 days.

(21) Appl. No.: 16/905,266

(22) Filed: Jun. 18, 2020

(65) Prior Publication Data

US 2021/0053259 A1 Feb. 25, 2021

(30) Foreign Application Priority Data

Aug. 21, 2019 (JP) .............................. JP2019-150828

(51) Int. Cl.
| | |
|---|---|
| *B29C 44/38* | (2006.01) |
| *B29C 45/00* | (2006.01) |
| *B29K 23/00* | (2006.01) |
| *B29K 105/00* | (2006.01) |
| *B29K 105/04* | (2006.01) |

(52) U.S. Cl.
CPC .......... *B29C 44/38* (2013.01); *B29C 45/0025* (2013.01); *B29C 45/0046* (2013.01); *B29C 2045/0039* (2013.01); *B29K 2023/12* (2013.01); *B29K 2105/0005* (2013.01); *B29K 2105/04* (2013.01)

(58) Field of Classification Search
None
See application file for complete search history.

(56) References Cited

U.S. PATENT DOCUMENTS 5,843,568 A * 12/1998 Masui .................. B29C 44/586
264/45.2
2005/0230861 A1 10/2005 Takatori et al.
2011/0304066 A1 12/2011 Obara

FOREIGN PATENT DOCUMENTS

| CN | 1649715 A | 8/2005 |
|---|---|---|
| JP | 2002-059450 A | 2/2002 |
| JP | 2002-248647 A | 9/2002 |
| JP | 2006-056006 A | 3/2006 |
| JP | 2008-189002 A | 8/2008 |

(Continued)

OTHER PUBLICATIONS

Helmut Eklat et al, "Injection Molding of Structural Foam Plastic Products", (West Germany), pp. 47-48, Light Industry Press, Aug. 31, 1982—partial English translation of CN202010521596.5 office action attached to uploaded reference as concise explanation.

*Primary Examiner* — Edmund H Lee
(74) *Attorney, Agent, or Firm* — Dinsmore & Shohl LLP (57) ABSTRACT

In an injection foam molding method, a relationship between a flow front moving speed (cm/s) of a foamed resin material in an injection step of injecting the foamed resin material into a cavity and amount of gas generated per 1 g of a resin material (ml/g) is defined as follows: the amount of gas generated per 1 g of the resin material is 0.36 ml/g or more; and the flow front moving speed (cm/s) is 75×the amount of gas generated per 1 g of the resin material (ml/g)−35 or more and 12 cm/s or more.

3 Claims, 5 Drawing Sheets

(56) References Cited

FOREIGN PATENT DOCUMENTS

| JP | 2009-248505 A | 10/2009 |
|----|---------------|---------|
| JP | 2010-167667 A | 8/2010  |
| JP | 2010-201640 A | 9/2010  |

\* cited by examiner

INJECTION FOAM MOLDING METHOD

CROSS-REFERENCE TO RELATED APPLICATIONS

This application claims priority to Japanese Patent Application No. 2019-150828 filed on Aug. 21, 2019, which is incorporated herein by reference in its entirety including the specification, drawings and abstract.

BACKGROUND

1. Technical Field

The present disclosure relates to an injection foam molding method. In particular, the present disclosure relates to improvement of an injection foam molding method capable of reducing generation of swirl marks.

2. Description of Related Art

Conventionally, an injection foam molded article has been used as a resin molded article such as a door trim in an automobile, for example. In the injection foam molding method for obtaining such an injection foam molded article, air bubbles are generated inside a foamed resin material at the time of injection molding so as to reduce generation of warps or sink marks in the injection foam molded article. As the injection foam molding method, a counter pressure method, a heat and cool method, and the like are known.

In the counter pressure method, as disclosed in Japanese Patent Application Publication No. 2010-167667, the internal pressure in a cavity of a mold is increased in advance, and in this state, a foamed resin material is injected into the cavity and then is depressurized to cause foaming inside the foamed resin material. Thereby, it is possible to reduce generation of swirl marks (which is a cause of deterioration in appearance quality due to bubbles appearing on the surface of the injection foam molded article) on the surface of the injection foam molded article, and thus an appearance quality of the injection foam molded article can be obtained.

Meanwhile, in the heat and cool method, a mold is heated in advance up to a heat deflection temperature of a foamed resin material or higher, and in this state, the foamed resin material is injected into a cavity so as to mold the foamed resin material into a predetermined shape along a molding surface of the mold while maintaining fluidity of the foamed resin material high. This method can also reduce generation of swirl marks on the surface of the injection foam molded article, and thus an appearance quality of the injection foam molded article can be obtained.

SUMMARY

Unfortunately, in the counter pressure method, the internal pressure in the cavity of the mold needs to be increased in advance, and in the heat and cool method, the mold needs to be heated in advance up to the heat deflection temperature of the foamed resin material or higher. Consequently, special molds and equipment are required, which causes increase in cost. In addition, the cycle time becomes longer by the time required for pressurizing the cavities and heating the molds, so that there is a limit to improvement in productivity.

The present disclosure has been made in view of such a point, and an object thereof is to provide an injection foam molding method capable of reducing generation of swirl marks while reducing the cost and the cycle time.

A solution of the present disclosure for achieving the above object is premised on an injection foam molding method that injects and foams a foamed resin material obtained by mixing a resin material and a foaming agent into a cavity of a mold so as to mold an injection foam molded article into a shape corresponding to a shape of the cavity. The injection foam molding method includes injecting the foamed resin material into the cavity in an injection step. In the injection step, a relationship between a flow front moving speed (cm/s) of the foamed resin material in the injection step and amount of gas generated per 1 g of the resin material (ml/g) is defined by following conditions.

The amount of gas generated per 1 g of the resin material is 0.36 ml/g or more; and the flow front moving speed (cm/s) is 75×the amount of gas generated per 1 g of the resin material (ml/g)−35 or more and is 12 cm/s or more.

With this specific matter, generation of swirl marks can be suppressed. In addition, sink marks generated in the injection foam molded article can be reduced. As one of the principles that can reduce generation of swirl marks, first of all, when the foamed resin material is injected into the cavity, the flow front moving speed of the foamed resin material is relatively high. Therefore, during this injection step, it is possible to obtain a state in which the foamed resin material comes into contact with the inner surface of the cavity to be cooled and hardened before bubbles existing in the foamed resin material reach the surface of the foamed resin material. Accordingly, the generation of swirl marks on the surface of the foamed resin material can be reduced.

In addition, as another principle that can reduce the generation of swirl marks, in the state in which the foamed resin material is injected into the cavity and the foamed resin material comes into contact with the inner surface of the cavity and then starts to be cooled and hardened, the foamed resin material flows in the cavity at the above-described flow front moving speed. Therefore, when the foamed resin material in a region in contact with the inner surface of the cavity receives a great fluid pressure of the foamed resin material flowing at a relatively high speed inward of this region (the opposite side to the inner surface of the cavity). Therefore, the foamed resin material (the foamed resin material in contact with the inner surface of the cavity) that is starting to be cooled and hardened is pressurized against the inner surface of the cavity with a relatively great pressure. As a result, even when air bubbles (air bubbles that cause swirl marks) are present on the surface of the foamed resin material that is starting to be hardened, the air bubbles are crushed by the action of the pressure, and the portion of the foamed resin material where the bubbles are crushed is molded along the inner surface of the cavity due to the pressure. Accordingly, the swirl marks do not remain on the surface of the foamed resin material.

As described above, while eliminating necessity of increasing the internal pressure of the cavity of the mold in advance (a step in the above-described counter pressure method) or necessity of heating the mold in advance up to a temperature equal to or higher than a heat deflection temperature of the foamed resin material (a step in the above-described heat and cool method), it is possible to reduce the generation of swirl marks. Therefore, cost reduction may be promoted without requiring special mold or equipment. In addition, the cycle time may be reduced without requiring the pressurization and the heating.

In the injection step, although the internal pressure of the cavity of the mold may be heated to some extent in advance, in some embodiments, the injection step may be carried out by injecting the foamed resin material into the cavity set at a normal pressure.

As described above, this configuration can eliminate necessity of providing special mold and equipment for increasing the internal pressure of the cavity in advance; thus, cost reduction can be promoted and necessity of pressurizing the inside of the cavity can be eliminated, to thereby reduce the cycle time.

In the injection step, the foamed resin material is injected into the cavity by a forward movement of an injection piston extruding the foamed resin material from a cylinder in which the foamed resin material is supplied; and the flow front moving speed is adjusted by controlling a forward moving speed of the injection piston.

The flow front moving speed of the foamed resin material in the cavity varies depending on the gate position in the mold and the shape of the cavity. For this reason, the flow front moving speed is adjusted by controlling the forward moving speed of the injection piston for injecting the foamed resin material supplied in the cylinder into the cavity. For example, at the timing when the foamed resin material flows into a region where the flow front moving speed is likely to decrease because the cross-sectional area of the cavity increases, the forward moving speed of the injection piston is set to be higher so as to satisfy the aforementioned condition of the flow front moving speed. As described above, the flow front moving speed can be optimized with a relatively simple control such as control on the forward moving speed of the injection piston, and thus the practicality of the injection foam molding method according to the present disclosure can be improved.

A mass reduction rate of the injection foam molded article relative to a mass of a molded article having the same shape and molded by a resin material containing no foaming agent is set to be 15 wt % or less.

With this configuration, as an effect obtained by using the foamed resin material, it is possible to promote weight reduction of the molded article.

In the injection foam molding method of the present disclosure, the relationship between the flow front moving speed (cm/s) of the foamed resin material in the injection step of injecting the foamed resin material into the cavity and the amount of gas generated per 1 g of the resin material (ml/g) is set as follows: the amount of gas generated per 1 g of the resin material is 0.36 ml/g or more, and the flow front moving speed (cm/s) is 75×the amount of gas generated per 1 g of the resin material (ml/g)−35 or more and 12 (cm/s) or more. This configuration eliminates necessity of providing special mold and equipment for increasing the internal pressure of the cavity and heating the mold; thus, cost reduction can be promoted and pressurization of the cavity and heating of the mold are not required, to thereby reduce generation of swirl marks while reducing the cycle time.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described with reference to the drawings. In the present embodiment, description will be provided on the case in which the present disclosure is applied as an injection foam molding method of molding an interior component (for example, a door trim, an instrument panel, etc.) of an automobile, which is molded as an injection foam molded article.

Schematic Configuration of Injection Foam Molding Apparatus

Before the injection foam molding method will be described, a schematic configuration of an injection foam molding apparatus in which the injection foam molding method is performed will be described.

Figure 1:
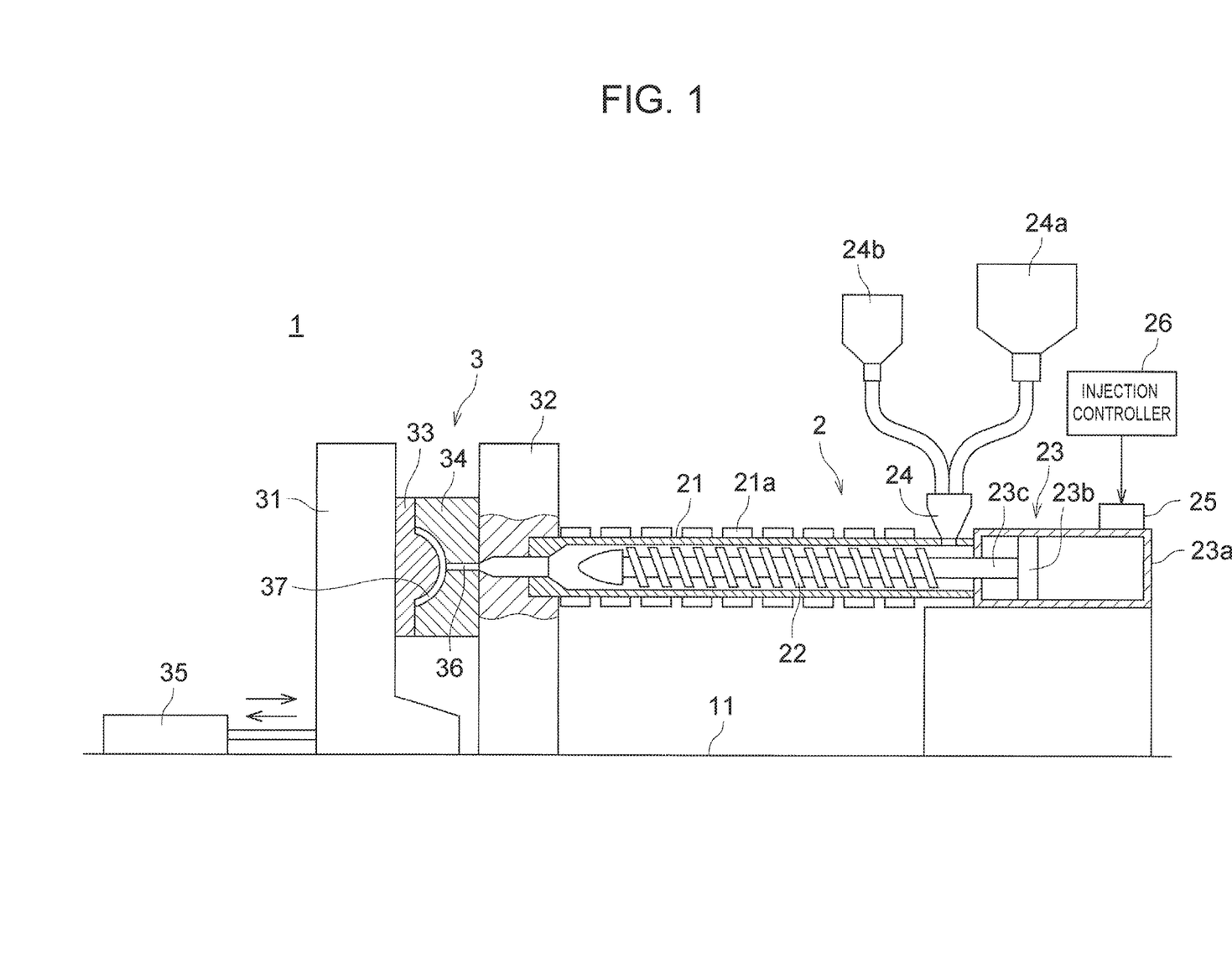
FIG. 1 is a view showing a schematic configuration of an injection foam molding apparatus according to an embodiment.

FIG. 1 is a view showing a schematic configuration of an injection foam molding apparatus 1 according to the present embodiment. As shown in FIG. 1, the injection foam molding apparatus 1 includes: an injection unit 2 that injects a foamed resin material; and a mold unit 3 that is supplied with the foamed resin material injected from the injection unit 2 and molds the received foamed resin material into an injection foam molded article.

Injection Unit

The injection unit 2 includes: an injection cylinder (also referred to as a cylinder in the present disclosure) 21; a screw 22; and an injection device 23. The injection cylinder 21 has a front end connected to the mold unit 3, and is provided with a hopper 24 supplied with a foaming agent and a resin material. A resin material tank 24a and a foaming agent tank 24b are connected to the hopper 24, and the hopper 24 is supplied with the resin material and the foaming agent from these tanks 24a, 24b. The resin material is pellet-shaped PP (polypropylene), for example. The resin material is not limited to this. As the foaming agent, a chemical foaming agent (for example, a sodium hydrogen carbonate-based foaming agent, etc.) or a physical foaming agent (for example, a microcapsule having foamability, etc.) is used. The foaming agent is not limited to them.

A screw 22 is housed inside the injection cylinder 21, and the resin material and the foaming agent supplied via the hopper 24 into the injection cylinder 21 are mixed by rotation of the screw 22. A band heater 21a is mounted around the outer circumference of the injection cylinder 21 such that the resin material and the foaming agent supplied into the injection cylinder 21 are heated by the band heater 21a. The mechanism for rotating the screw 22 and the configuration of the band heater 21a are well known, and thus description thereof is omitted here.

The injection device 23 is configured by housing a piston (also referred to as an injection piston in the present disclosure) 23b in the cylinder 23a, and a rod 23c extending from the piston 23b is connected to a rear end of the screw 22. That is, in the injection device 23, as the piston 23b moves forward and backward in the cylinder 23a, the screw 22 also moves forward and backward in the injection cylinder 21; and the forward movement of the screw 22 extrudes the foamed resin material (foamed resin material obtained by mixing the resin material and the foaming agent) in the injection cylinder 21 toward the mold unit 3.

In the injection device 23, the moving speed (forward and backward moving speed) of the piston 23b is variable. For example, when the injection device 23 is of a hydraulic type, the moving speed (forward moving speed) of the piston 23b is adjusted by controlling a supply hydraulic pressure supplied to the cylinder 23a. Specifically, the injection device 23 includes: an adjusting unit 25 for adjusting the supply hydraulic pressure; and an injection controller 26 configured by a microcomputer for controlling the adjusting unit 25; thus, the adjusting unit 25 adjusts the supply hydraulic pressure in accordance with a command signal from the injection controller 26 so as to adjust the moving speed of the piston 23b. In addition, the injection device 23 may be of a pneumatic type or an electric type using an electric motor. Also in these cases, the moving speed of the piston 23b is adjusted in accordance with a command signal from the injection controller 26. By adjusting the moving speed of the piston 23b in the above manner, the moving speed of the screw 22 housed inside the injection cylinder 21 is also adjusted, to thereby adjust the amount of the foamed resin material supplied into a cavity 37 of the mold unit 3 per unit time, as well.

Mold Unit

The mold unit 3 includes: a movable platen 31 slidably supported on a base 11; a fixed platen 32 fixed on the base 11; a movable mold 33 supported on the movable platen 31; a fixed mold 34 supported on the fixed platen 32; and a cylinder 35 that slides the movable platen 31 on the base 11. A gate 36 into which the foamed resin material supplied from the injection device 23 flows is formed in the fixed platen 32 and the fixed mold 34.

The operation of the cylinder 35 brings the movable mold 33 to move forward (move to the right side in FIG. 1) together with the movable platen 31 so as to perform mold-clamping between the movable mold 33 and the fixed mold 34, to thereby form the cavity 37 having a predetermined shape (shape corresponding to an interior component of an automobile to be molded) between the movable mold 33 and the fixed mold 34.

Further, the mold unit 3 is provided with a cooling unit (not shown) for cooling the foamed resin material injected into the cavity 37. An example of the cooling unit may include a well-known cooling unit using water cooling.

Injection Foam Molding

Next, an outline of injection foam molding by the injection foam molding apparatus 1 configured as described above will be described.

In this injection foaming molding, the movable platen 31 first moves forward by the operation of the cylinder 35 from a position where the movable platen 31 is retracted from the fixed platen 32, and thereby the movable mold 33 and the fixed mold 34 are mold-clamped to form the cavity 37 having a predetermined shape between the molds 33, 34.

In this state, the resin material is supplied from the resin material tank 24a to the hopper 24, and the foaming agent is supplied from the foaming agent tank 24b to the hopper 24. The resin material and the foaming agent supplied to the hopper 24 are then supplied to the injection cylinder 21 and mixed by the rotation of the screw 22 in the injection cylinder 21. At the time of the mixing, the resin material and the foaming agent in the injection cylinder 21 are heated by the band heater 21a to increase its fluidity, to thus smoothly perform the mixing.

Figure 2:
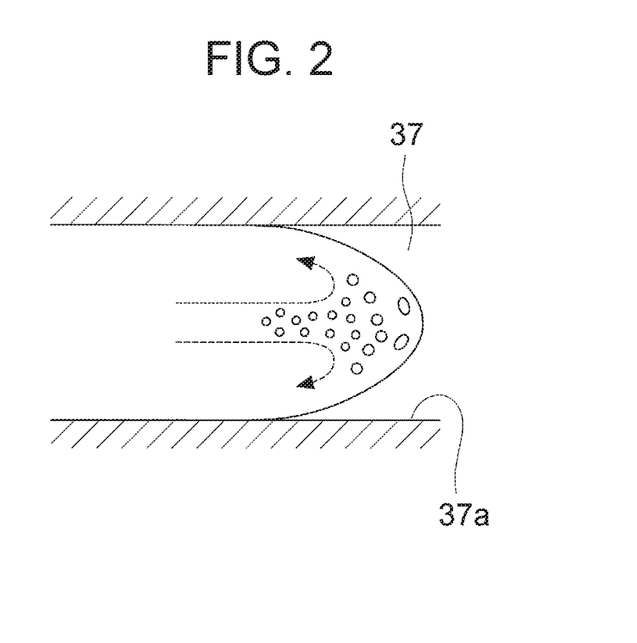
FIG. 2 is a view explaining a flow of a foamed resin material in a cavity of a mold in an injection step.

Thereafter, the rotation of the screw 22 is stopped, and the adjusting unit 25 operates to move the piston 23b forward at a predetermined speed in accordance with a command signal from the injection controller 26 of the injection device 23. This forward movement of the piston 23b brings the screw 22 to move forward in the injection cylinder 21, and as the screw 22 thus moves forward, the foamed resin material in the injection cylinder 21 is extruded toward the mold unit 3. That is, the foamed resin material in the injection cylinder 21 is injected through the gate 36 of the mold unit 3 into the cavity 37 (an injection step). At this time, the inside of the cavity 37 is set at a normal pressure in advance, and the foamed resin material is injected into the cavity 37 at this normal pressure. FIG. 2 is a view showing a state in which the foamed resin material flows in the cavity 37 in the injection step. As shown in this drawing, a front end portion of the foamed resin material flowing in the cavity 37 is formed in a substantially conical shape (a substantially conical shape having a shell shape at its front end portion), and at its front end portion, a flow (a flow swirled toward the outer circumferential side) due to a so-called fountain flow phenomenon is caused as shown by broken arrows in the drawing. The speed at the front end portion of the foamed resin material in the cavity 37 (a flow front moving speed; a moving speed toward the right side in FIG. 2) will be described later in detail.

The temperatures of the molds 33, 34 in the above injection step are maintained constant within a range of 20° C. to 60° C. There are various ways for maintaining the temperature of the molds 33, 34 constant. Examples of this may include control on the band heater 21a, control on the cooling unit, control by providing the mold unit 3 with a heater, and the others. Further, the pressure (a peak pressure value) in the cavity 37 in this injection step is approximately 30 MPa.

Figure 3:
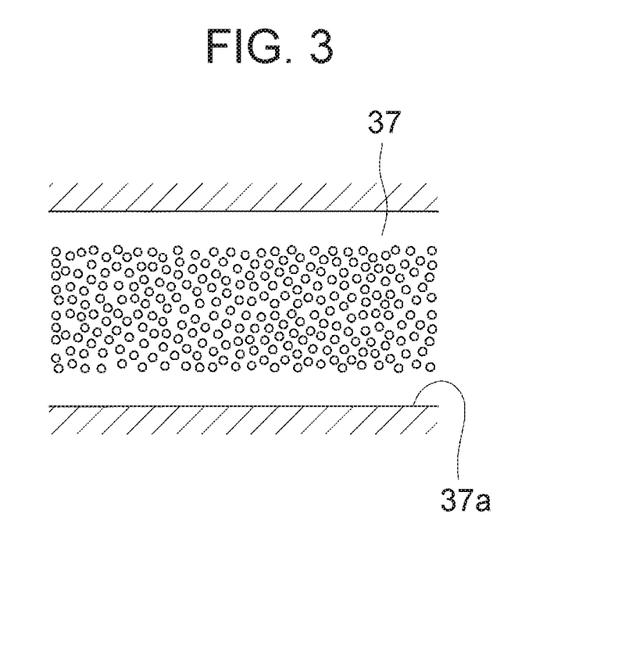
FIG. 3 is a view showing a state in which a foamed resin material is cooled and foamed in the cavity of the mold.
Figure 4:
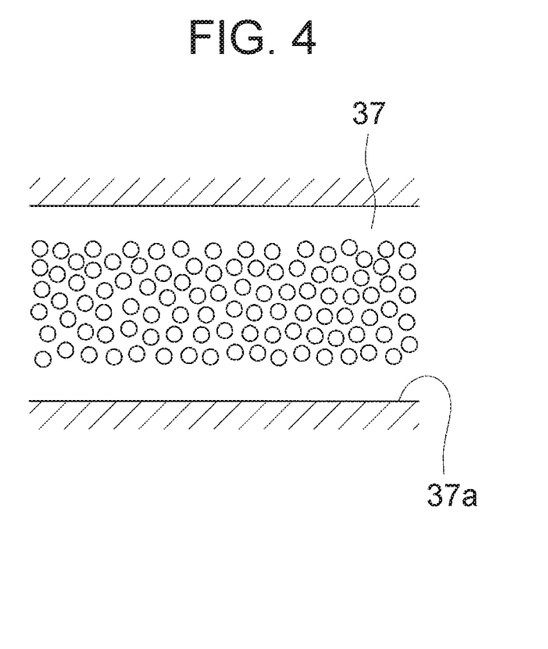
FIG. 4 is a view showing a solidified state of the foamed resin material in the cavity of the mold.

After the injection step is completed, the foamed resin material is cooled by the cooling unit provided to the mold unit 3. This cooling hardens the foamed resin material, so that the internal pressure of the cavity 37 decreases, and thus bubbles are generated in the foamed resin material. FIG. 3 shows the cooled and foamed state of the foamed resin material in the cavity 37. Thereafter, as the foamed resin material is hardened, an injection foam molded article having a shape corresponding to the shape of the cavity 37 is molded. FIG. 4 shows a solidified state of the foamed resin material in the cavity 37.

The movable platen 31 moves backward along with the operation of the cylinder 35 to open the molds, whereby the injection foam molded article thus molded is removed from the mold unit 3. The above is the outline of the injection foam molding.

Amount of Gas Generated Per 1 g of Resin Material and Flow Front Moving Speed

The present embodiment has a feature that defines the amount of gas generated per 1 g of the resin material (base material) and the flow front moving speed of the foamed resin material in the injection step. A specific description thereof will be provided hereinafter.

As described above, a counter pressure method, a heat and cool method, and the like are known as conventional injection foam molding methods that can reduce generation of swirl marks (a cause of deterioration of the appearance quality due to bubbles generated on the surface of an injection foam molded article) on the surface of the injection foam molded article. However, in the counter pressure method, it is necessary to increase the internal pressure of the cavity of the mold in advance; and in the heat and cool method, it is necessary to heat the mold in advance up to a temperature not less than a heat deflection temperature of the foamed resin material; therefore, special mold and equipment are required, which causes cost increase. Further, the cycle time becomes longer by the time required for pressurizing the cavity and heating the mold, so that there is a limit to improvement of the productivity.

In the present embodiment, in light of this point, the relationship between the flow front moving speed of the foamed resin material in the injection step of injecting the foamed resin material into the cavity 37 and the amount of gas generated per 1 g of the resin material are defined, to thereby reduce generation of swirl marks without using the counter pressure method or the heat and cool method, that is, while promoting cost reduction as well as reduction in cycle time.

Using multiple types of foamed resin materials, by changing the flow front moving speed and the amount of gas generated per 1 g of the resin material for each type (the amount of gas generated per 1 g of the resin material is changed by changing the type of the foaming agent, etc.), a range in which generation of swirl marks can be reduced is found in a relationship between the flow front moving speed of each foamed resin material and the amount of gas generated per 1 g of the resin material. A specific description thereof will be provided hereinafter.

Figure 5:
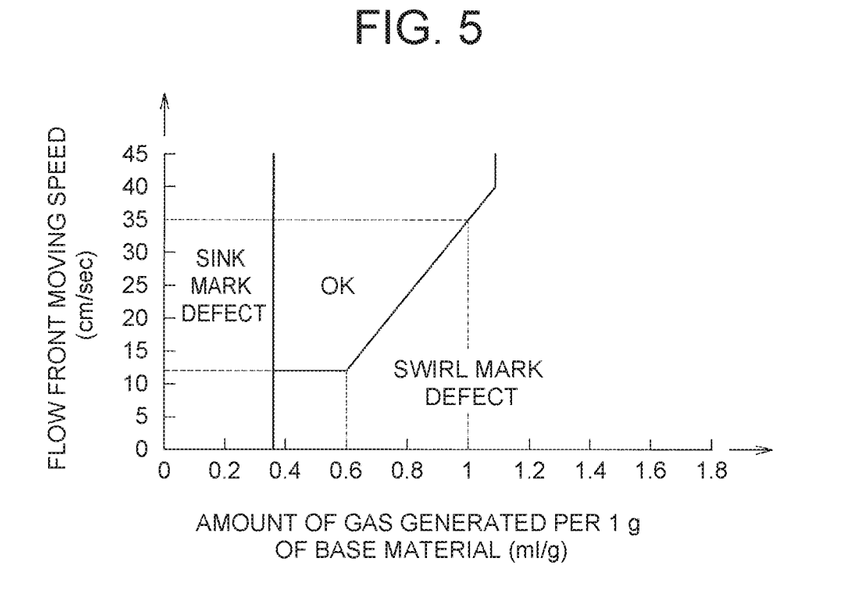
FIG. 5 is a view showing results of an evaluation test in which amount of gas generated per 1 g of a base material and a flow front moving speed are changed when a first foamed resin material is used.
Figure 6:
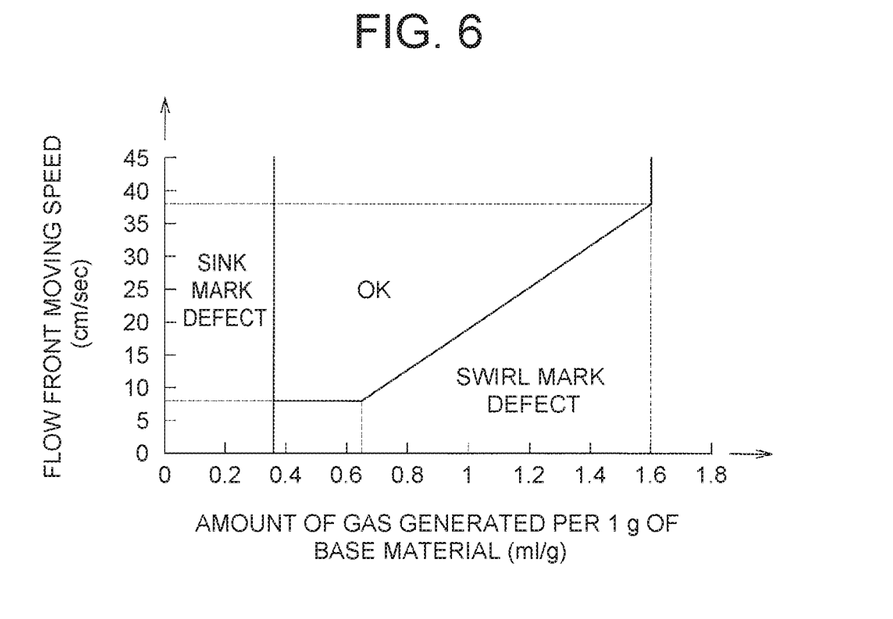
FIG. 6 is a view showing results of an evaluation test in which amount of gas generated per 1 g of a base material and a flow front moving speed are changed when a second foamed resin material is used.
Figure 7:
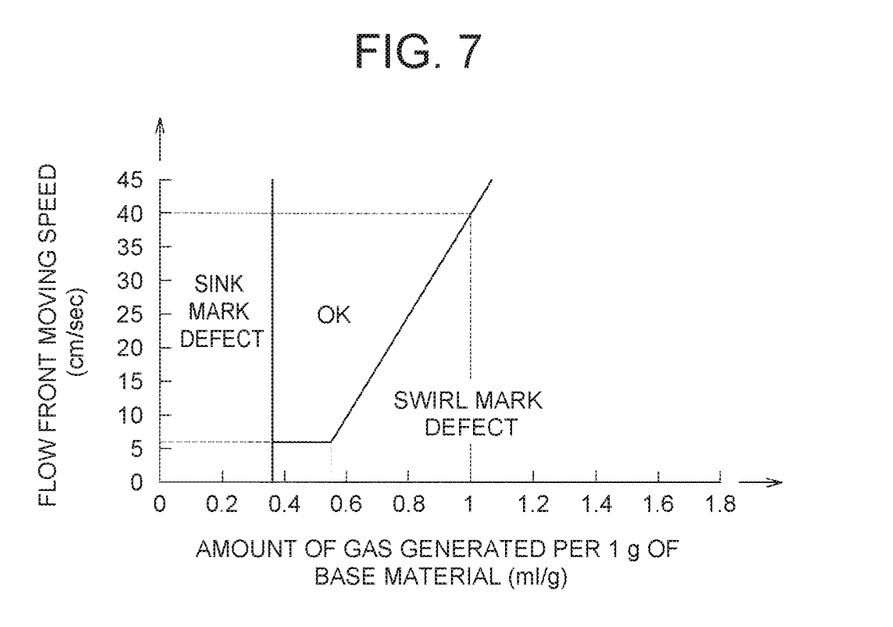
FIG. 7 is a view showing results of an evaluation test in which amount of gas generated per 1 g of a base material and a flow front moving speed are changed when a third foamed resin material is used.

FIG. 5 is a view showing results of an evaluation test in which the amount of gas generated per 1 g of the resin material (base material) and the flow front moving speed are changed when the first foamed resin material is used. FIG. 6 is a view showing results of an evaluation test in which the amount of gas generated per 1 g of the resin material and the flow front moving speed are changed when the second foamed resin material is used. FIG. 7 is a view showing results of an evaluation test in which the amount of gas generated per 1 g of the resin material and the flow front moving speed are changed when the third foamed resin material is used. These first to third foamed resin materials are well-known general PP materials used for molding interior components of automobiles. These foamed resin materials are various types of PP materials represented by well-known SOP (super olefin polymer), for example.

As shown in FIG. 5, in the first foamed resin material, when the amount of gas generated per 1 g of the resin material was less than 0.36 ml/g, sink marks were generated regardless of the flow front moving speed, so that it was determined to be failure as an interior component (sink mark defect (NG) determination: a condition in which unacceptable sink marks were generated). When the amount of gas generated per 1 g of the resin material was 0.36 ml/g or more and less than 0.6 ml/g, swirl marks were generated on the surface if the flow front moving speed was less than 12 (cm/s), so that it was determined to be failure (swirl mark defect (NG) determination) as an interior component. When the amount of gas generated per 1 g of the resin material was 1.1 ml/g, swirl marks were generated on the surface if the flow front moving speed was less than 40 (cm/s). As a result, it is found that when the amount of gas generated per 1 g of the resin material is within a range of 0.6 ml/g or more and 1.1 ml/g or less, the upper limit of the flow front moving speed in the swirl mark defect range is defined by the following formula (1):

$$\text{the flow front moving speed (cm/s)} = 57.5 \times \text{the amount of gas generated per 1 g of the resin material (ml/g)} - 22.5 \quad (1).$$

When the amount of gas generated per 1 g of the resin material was more than 1.1 ml/g, swirl marks were generated on the surface regardless of the flow front moving speed, so that it was determined to be failure as an interior component.

Accordingly, in the case of the first foamed resin material, an interior component having a good appearance quality can be obtained within a range excluding the above sink mark defect range as well as the above swirl mark defect range in FIG. 5. In addition, this range for the appearance quality includes both a range in which an interior component having almost no adverse effect due to the mixing of the foaming agent can be obtained and a range in which an interior component in an acceptable range of deterioration in appearance quality can be obtained.

Also, as shown in FIG. 6, in the case of the second foamed resin material, when the amount of gas generated per 1 g of the resin material was less than 0.36 ml/g, sink marks were generated regardless of the flow front moving speed, so that it was determined to be failure as an interior component. Further, when the amount of gas generated per 1 g of the resin material is 0.36 ml/g or more and less than 0.65 ml/g, swirl marks were generated on the surface if the flow front moving speed is less than 8 (cm/s), so that it was determined to be failure as an interior component. When the amount of gas generated per 1 g of the resin material was 1.6 ml/g, swirl marks were generated on the surface if the flow front moving speed was less than 38 (cm/s). As a result, it is found that when the amount of gas generated per 1 g of the resin material was within a range of 0.65 ml/g or more and 1.6 ml/g or less, the upper limit of the flow front moving speed in the swirl mark defect range is defined by the following formula (2):

$$\text{the flow front moving speed (cm/s)} = 30 \times \text{the amount of gas generated per 1 g of the resin material (ml/g)} - 10 \quad (2).$$

Further, when the amount of gas generated per 1 g of the resin material was more than 1.6 ml/g, swirl marks were generated on the surface regardless of the flow front moving speed, so that it was determined to be failure as an interior component.

Accordingly, in the case of the second foamed resin material, an interior component having a good appearance quality can be obtained within a range excluding the above sink mark defect range and the above swirl mark defect range in FIG. 6.

As shown in FIG. 7, in the case of the third foamed resin material, when the amount of gas generated per 1 g of the resin material was less than 0.36 ml/g, sink marks were generated regardless of the flow front moving speed, so that it was determined to be failure as an interior component. When the amount of gas generated per 1 g of the resin material was 0.36 ml/g or more and less than 0.53 ml/g, swirl marks were generated on the surface if the flow front moving speed was less than 6 (cm/s), so that it was determined to be failure as an interior component. As a result, it is found that when the amount of gas generated per 1 g of the resin material was within a range of 0.53 ml/g or more, the upper limit of the flow front moving speed in the swirl mark defect range is defined by the following formula (3):

$$\text{the flow front moving speed (cm/s)} = 75 \times \text{the amount of gas generated per 1 g of the resin material (ml/g)} - 35 \quad (3).$$

Therefore, in the case of the third foamed resin material, an interior component having a good appearance quality can be obtained within a range excluding the sink mark defect range and the swirl mark defect range in FIG. 7.

Figure 8:
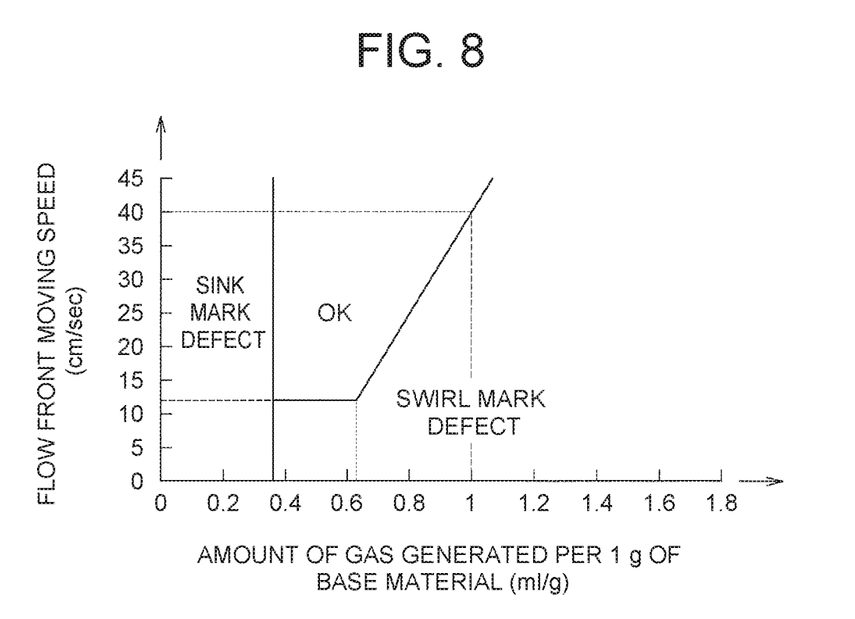
FIG. 8 is a view showing an appropriate range of the amount of gas generated per 1 g of the base material and the flow front moving speed that are set based on each evaluation test.

From the above description, as shown in FIG. 8, the range in which neither sink mark defects nor swirl mark defects are generated in each of the multiple types of foamed resin materials can be found by the following conditions: the amount of gas generated per 1 g of the resin material is 0.36 ml/g or more, and the flow front moving speed is not less than a value calculated from the following formula (4) and not less than 12 (cm/s). This formula (4) is the same as the above formula (3), and is defined by the characteristics of the third foamed resin material.

$$\text{The flow front moving speed} = 75 \times \text{the amount of gas generated per 1 g of the resin material (ml/g)} - 35 \quad (4).$$

That is, by defining the amount of gas generated per 1 g of the resin material and the flow front moving speed within this range, generation of swirl marks can be reduced by using neither the conventional counter pressure method nor the heat and cool method.

Note that the upper limit of the flow front moving speed is a limit value determined by the configuration of the injection foam molding apparatus 1. The upper limit of the amount of gas generated per 1 g of the resin material is a value of the upper limit of the flow front moving speed calculated by the formula (4), that is, a value limited by an upper limit limited by the configuration of the injection foam molding apparatus 1.

The method of adjusting the flow front moving speed defined as described above will be described. As described above, the flow front moving speed in the cavity 37 can be adjusted by controlling the forward moving speed of the piston 23b of the injection device 23. The flow front moving speed in the cavity 37 varies depending on the position of the gate 36 in the fixed mold 34 and the shape of the cavity 37. For this reason, for example, at the timing when the foamed resin material flows into a region where the flow front moving speed is likely to be lower because the cross-sectional area of the cavity 37 increases, the forward moving speed of the piston 23b of the injection device 23 is set to be higher so as to satisfy the aforementioned condition of the flow front moving speed. The change of the forward moving speed of the piston 23b in accordance with the shape of the cavity 37 is determined in advance based on experiments and simulations based on the position of the gate 36 in the fixed mold 34 and the shape of the cavity 37.

Specifically, the flow front moving speed can be calculated by the following formula (5).

$$\text{The flow front moving speed} = \text{the amount of the foamed resin material injected into the cavity per unit time} / (\text{total extension length of the flow front in the cavity} \times \text{plate thickness}) \quad (5)$$

Hereinafter, description will be provided on the principle that can reduce the generation of the swirl marks by defining the flow front moving speed in above manner. As the principle that can reduce the generation of the swirl marks, the following two principles may be listed.

First, in the present embodiment, when the foamed resin material is injected into the cavity 37, the flow front moving speed of the foamed resin material becomes relatively high. Therefore, during this injection step, it is possible to obtain a situation in which the foamed resin material comes into contact with the inner surface 37a of the cavity 37 to be cooled and hardened before bubbles existing in the foamed resin material reach the surface of the foamed resin material. Accordingly, it is conceivable that the generation of swirl marks on the surface of the foamed resin material can be reduced.

In addition, as another principle, in the state in which the foamed resin material is injected into the cavity 37 and the foamed resin material comes into contact with the inner surface 37a of the cavity 37 and then starts to be cooled and hardened, the foamed resin material flows in the cavity 37 at the above-described flow front moving speed. Therefore, when the foamed resin material in a region in contact with the inner surface 37a of the cavity 37 receives a great fluid pressure of the foamed resin material flowing inward of this region (the opposite side to the inner surface 37a of the cavity 37) at a relatively high speed. Therefore, the foamed resin material starting to be cooled and hardened (the foamed resin material in contact with the inner surface 37a of the cavity 37) is pressed against the inner surface 37a of the cavity 37 with a relatively great pressure. As a result, even when air bubbles (air bubbles as a cause of swirl marks) are present on the surface of the foamed resin material that is starting to be hardened, the air bubbles are crushed by the action of the pressure, and the portion of the foamed resin material where the air bubbles are crushed is molded along the inner surface 37a of the cavity 37 by the pressure. Accordingly, the swirl marks do not remain on the surface of the foamed resin material.

As described above, according to the present embodiment, without requiring the internal pressure of the cavity of the mold to be increased in advance (a step in the above-described counter pressure method) or without requiring the mold to be heated in advance up to a temperature equal to or higher than a heat deflection temperature of the foamed resin material (a step in the above-described heat and cool method), it is possible to reduce the generation of swirl marks. Therefore, cost reduction may be promoted without requiring special mold or equipment. In addition, the cycle time may be reduced without requiring pressurization of the cavity and heating of the mold.

In addition, a specific example of the foaming agent for molding an interior component of an automobile may include "Polythlene EE65C" (trade name) manufactured by Eiwa Chemical Co., Ltd., for example. In order to satisfy the relationship between the flow front moving speed of the foamed resin material and the amount of gas generated per 1 g of the resin material using this foaming agent, the relationship between the flow front moving speed of the foamed resin material in the injection step and a foaming agent addition rate in the foamed resin material is set as follows: the foaming agent addition rate in the foamed resin material is 0.5 wt % or more, and the flow front moving speed (cm/s) is 64×the foaming agent addition rate (wt %)−48 or more and 16 (cm/s) or more. In this case, the upper limit of the foaming agent addition rate is approximately 3.0 wt %. In addition, the upper limit of the flow front moving speed is a limit value determined by the configuration of the injection foam molding apparatus 1.

Further, as a further effect of the present embodiment, since it is unnecessary to increase the internal pressure of the cavity 37 in advance, a special sealing structure is not required between the movable mold 33 and the fixed mold 34, and thus cost reduction can also be promoted.

In the present embodiment, the flow front moving speed is adjusted by controlling the forward moving speed of the piston 23b of the injection device 23. Therefore, the flow front moving speed can be optimized with a relatively simple control, which can promote enhancement of practicality of the injection foam molding method.

Further, in the above embodiment, the mass reduction rate of the injection foam molded article molded is set to be 15 wt % or less. The mass reduction rate is a value representing a reduction ratio of the mass relative to a mass of a molded article having the same shape that is molded by a resin material containing no foaming agent, and can be calculated by the following formula (6).

$$\text{The mass reduction rate}=(1-\text{the mass of the injection foam molded article/the mass of a molded article by solid molding})\times 100 \quad (6)$$

where, the molded article by solid molding is a molded article molded by a resin material containing no foaming agent.

Another Embodiment

Note that the present disclosure is not limited to the above described embodiment, and all modifications and applications included in the claims and the scope equivalent to the claims are possible.

For example, in the above described embodiment, the description has been provided on the case in which the present disclosure is applied as the injection foam molding method of molding an interior component of an automobile. The present disclosure is not limited to this, and is applicable as the injection foam molding method of molding various injection foam molded articles.

In the above described embodiment, the resin material and the foaming agent are supplied into the hopper 24, and thereby the resin material and the foaming agent are mixed inside the hopper 24 and inside the injection cylinder 21. The present disclosure is not limited to this, and a foamed resin material formed by pre-mixing a resin material and a foaming agent may be supplied to the inside of the injection cylinder 21 via the hopper 24.

In the above embodiment, the molds 33, 34 are cooled as as a way for foaming the foamed resin material in the cavity 37. The present disclosure is not limited to this, and the foamed resin material may be foamed using a so-called core back molding that enlarges a volume of the cavity. The cooling of the molds 33, 34 and the core back molding may be used together.

In the above-described embodiment, in the injection step, the foamed resin material is injected into the cavity 37 set at a normal pressure in advance. The present disclosure is not limited to this, and the internal pressure of the cavity 37 may be increased to some extent in advance. That is, the conventional counter pressure method may be used together.

The present disclosure is applicable to the injection foam molding method of obtaining an injection foam molded article as a resin molded article applied to an automobile.

What is claimed is:

1. An injection foam molding method that injects and foams a foamed resin material obtained by mixing a resin material and a foaming agent into a cavity of a mold so as to mold an injection foam molded article into a shape corresponding to a shape of the cavity, the method comprising:
injecting the foamed resin material into the cavity in an injection step,
wherein, in the injection step, a relationship between a flow front moving speed (cm/s) of the foamed resin material in the injection step and amount of gas generated per 1 g of the resin material (ml/g), is defined by following conditions:
the amount of gas generated per 1 g of the resin material is 0.36 ml/g or more; and
the flow front moving speed (cm/s) is 75×the amount of gas generated per 1 g of the resin material (ml/g)−35 or more and 12 cm/s or more.

2. The injection foam molding method according to claim 1, wherein:
in the injection step, the foamed resin material is injected into the cavity by a forward movement of an injection piston extruding the foamed resin material from a cylinder in which the foamed resin material is supplied; and
the flow front moving speed is adjusted by controlling a forward moving speed of the injection piston.

3. The injection foam molding method according to claim 1 wherein a mass reduction rate of the injection foam molded article relative to a mass of a molded article having the same shape and molded by a resin material containing no foaming agent is set to be 15 wt % or less.

\* \* \* \* \*